United States Patent
Abou-Sayed et al.

(10) Patent No.: US 12,281,542 B2
(45) Date of Patent: Apr. 22, 2025

(54) SUBTERRANEAN SEQUESTRATION OF LOW-DENSITY ORGANIC WASTES

(71) Applicant: ADVANTEK WASTE MANAGEMENT SERVICES, LLC, Houston, TX (US)

(72) Inventors: Omar Abou-Sayed, Houston, TX (US); Ibrahim Mohamed, Houston, TX (US); Yeshesh Panchal, Houston, TX (US); Mahmoud Ashwamy, Houston, TX (US); Jay Cecil, Houston, TX (US); Steve Pangburn, Houston, TX (US); Omar Sameh, Cairo (EG)

(73) Assignee: Adantek Waste Management Services, Inc., Houston, TX (US)

( * ) Notice: Subject to any disclaimer, the term of this patent is extended or adjusted under 35 U.S.C. 154(b) by 0 days.

(21) Appl. No.: 18/248,866

(22) PCT Filed: Dec. 13, 2021

(86) PCT No.: PCT/US2021/063167
§ 371 (c)(1),
(2) Date: Apr. 12, 2023

(87) PCT Pub. No.: WO2022/082125
PCT Pub. Date: Apr. 21, 2022

(65) Prior Publication Data
US 2024/0018850 A1 Jan. 18, 2024

Related U.S. Application Data

(60) Provisional application No. 63/158,284, filed on Mar. 8, 2021, provisional application No. 63/091,203, filed on Oct. 13, 2020, provisional application No. 63/091,194, filed on Oct. 13, 2020.

(51) Int. Cl.
*E21B 41/00* (2006.01)

(52) U.S. Cl.
CPC .............................. *E21B 41/0064* (2013.01)

(58) Field of Classification Search
CPC ...... E21B 41/0064; E21B 43/00; E21B 47/06; E21F 17/16; A62D 3/00; B09F 3/00
See application file for complete search history.

(56) References Cited

U.S. PATENT DOCUMENTS

| | | | |
|---|---|---|---|
| 4,273,615 A | 6/1981 | Hirbod | |
| 5,511,905 A * | 4/1996 | Bishop | B65G 5/00 166/57 |
| 6,137,028 A * | 10/2000 | Snow | G21F 9/24 405/59 |
| 6,491,616 B2 | 12/2002 | Bruno et al. | |
| 9,284,120 B2 * | 3/2016 | Oates | B65G 5/00 |
| 9,332,253 B2 * | 5/2016 | Terada | H04N 19/70 |

(Continued)

OTHER PUBLICATIONS

International Search Report and Written Opinion, PCT/US2021/063167, dated May 2, 2022, 11 pages.

*Primary Examiner* — Silvana C Runyan
(74) *Attorney, Agent, or Firm* — Booth Albanesi Schroeder PLLC; Peter V. Schroeder

(57) ABSTRACT

Methods and apparatus are provided for disposal of Fat, Oil and Grease (FOG) wastes in subterranean formations, and for disposal of low-density organic wastes in subterranean, brine-filled caverns.

13 Claims, 6 Drawing Sheets

(56) References Cited

U.S. PATENT DOCUMENTS

| | | | |
|---|---|---|---|
| 2005/0105971 A1* | 5/2005 | Maduell | E21B 43/28 405/129.1 |
| 2008/0203014 A1 | 8/2008 | Magner et al. | |
| 2010/0129155 A1* | 5/2010 | Kearney | B09B 1/008 405/59 |
| 2015/0321848 A1* | 11/2015 | Strybos | F17C 7/00 405/59 |
| 2019/0345910 A1* | 11/2019 | Novek | E02B 9/08 |

* cited by examiner

SUBTERRANEAN SEQUESTRATION OF LOW-DENSITY ORGANIC WASTES

CROSS-REFERENCE TO RELATED APPLICATIONS

This is a U.S. Non-Provisional Application for Patent based on PCT Application No. PCT/US2021/063167, filed Dec. 13, 2021, and claims priority to the following prior-filed applications for patent: U.S. Patent Application Ser. No. 63/091,194, filed Oct. 13, 2020; U.S. Patent Application Ser. No. 63/091,203, filed Oct. 13, 2020; and U.S. Patent Application Ser. No. 63/158,284, filed Mar. 8, 2021, each of which is incorporated herein in their entirety for all purposes.

FIELD

The disclosed methods and apparatus relate to the treatment and disposal of organic wastes into subterranean regions, and more particularly, to methods for disposing of organic wastes such as fat, oil and grease wastes and lighter-than-brine organic wastes.

BRIEF DESCRIPTION OF THE DRAWING

Drawings of the preferred embodiments of the present disclosure are attached hereto so that the embodiments of the present disclosure may be better and more fully understood.

DETAILED DESCRIPTION OF CERTAIN EMBODIMENTS

Waste Disposal by Injection

Figure 1:
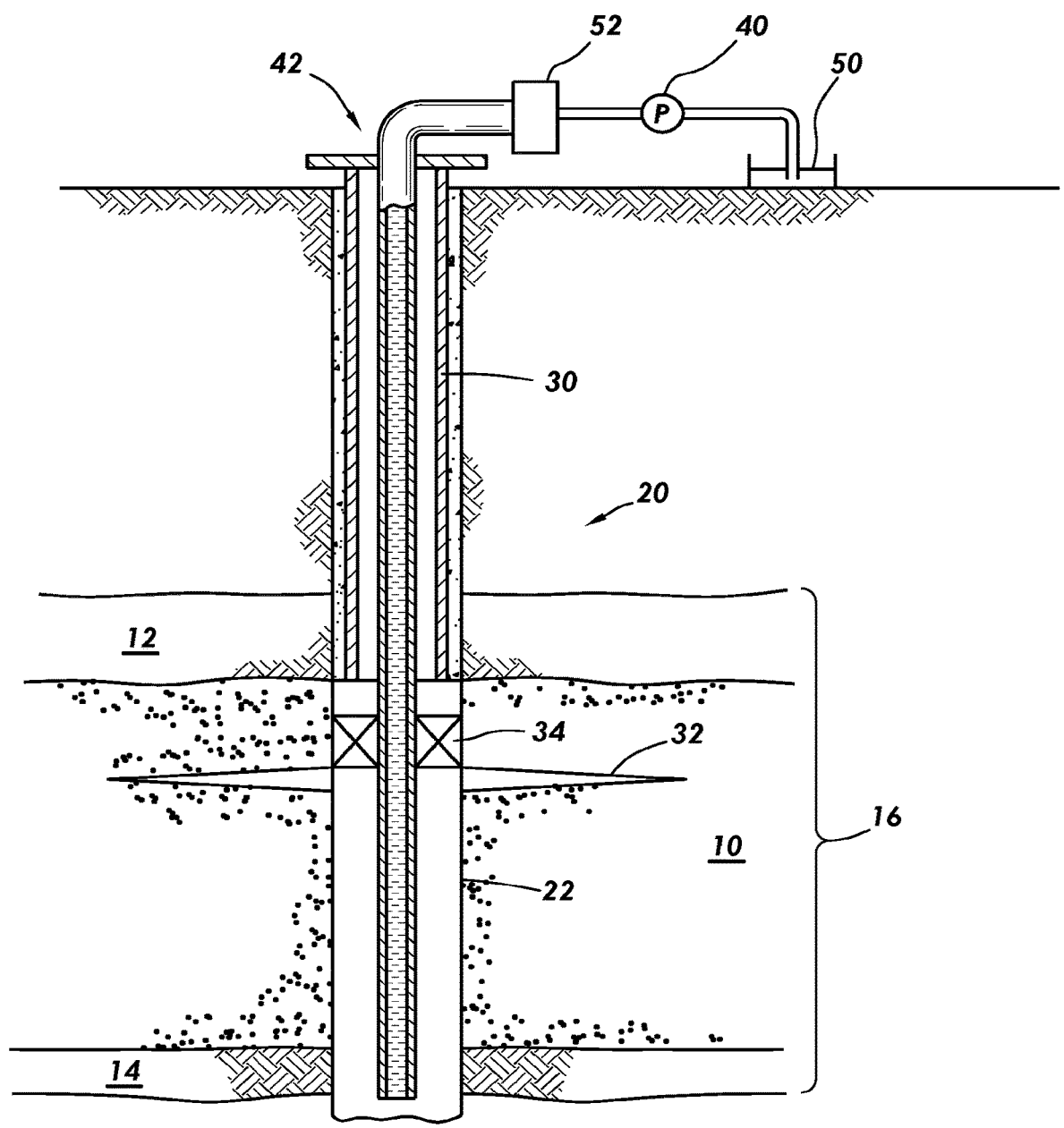
FIG. 1 is a schematic of an exemplary injection well disposal operation according to embodiments of the disclosure.
Figure 5:
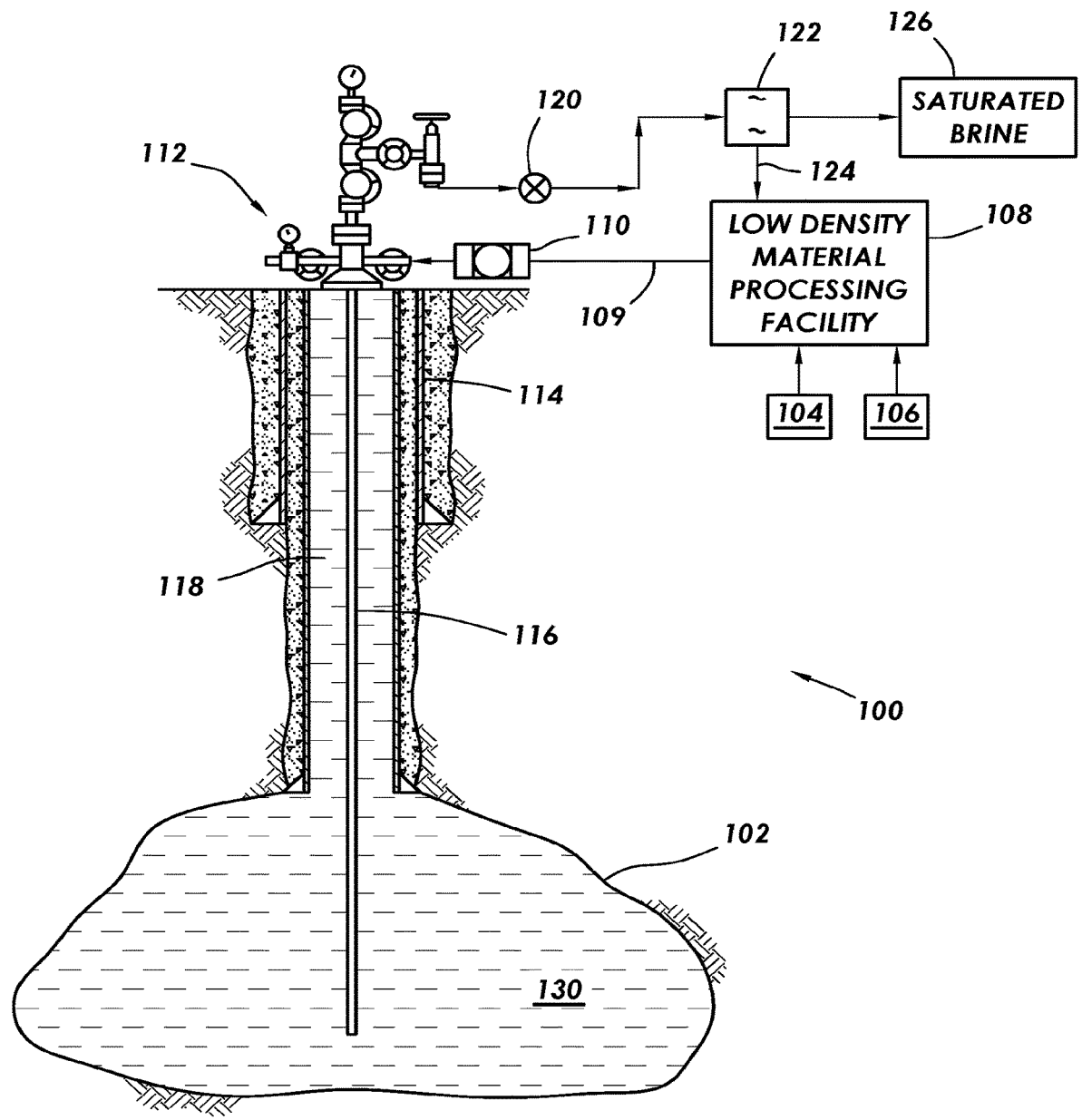
FIG. 5 is a schematic diagram of exemplary low-density organic material processing and single completion tubing injection systems according to aspects of the disclosure.
Figure 6:
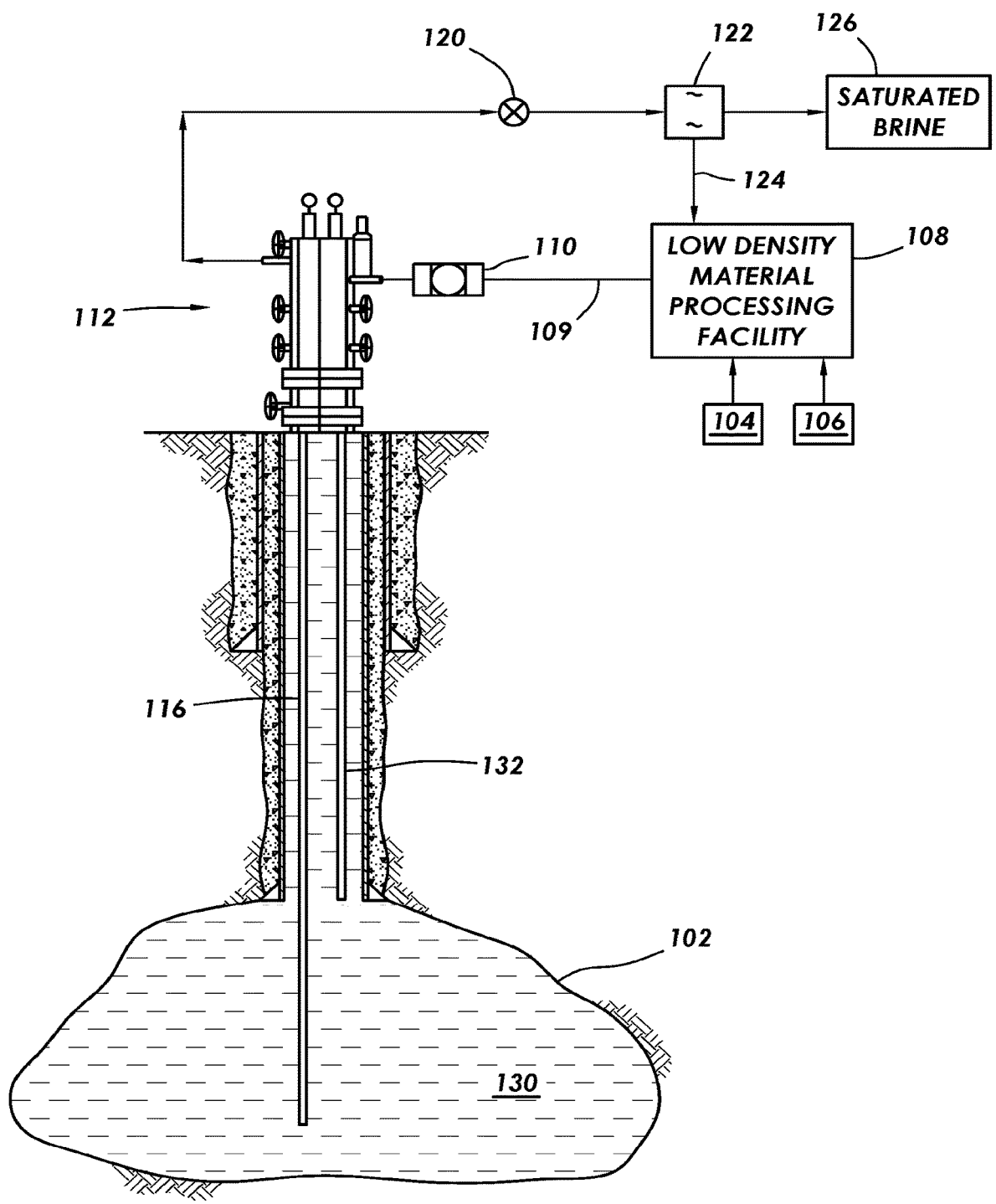
FIG. 6 is a schematic diagram of exemplary low-density organic material processing and dual completion tubing injection systems according to aspects of the disclosure.

Injection wells for pumping fluids into a subterranean zone or subterranean salt cavern are well-known. Injection wells can be employed to inject fluid wastes into a subterranean zone or cavern. FIG. 1 is a very simplified schematic of an exemplary injection well disposal operation into a target zone of a subterranean formation. FIGS. 5-6 are simplified schematics of exemplary injection disposal operations into a subterranean cavern and are discussed below herein.

Target Zone

A target zone 10 is typically confined by upper 12 and lower boundary zones 14. Waste disposal must occur in the target zone without breach of containment into the upper or lower boundary zones. A formation may have multiple target zones layered between multiple boundary zones. Similarly, the formation 16 may host several disposal wells. The target zone has associated physical parameters as is known in the art. For example, a zone has an associated permeability, porosity, formation pore pressure, formation stresses, Young's modulus of elasticity, and Poisson's ratio. Further parameters can be used, such as overburden pressure, and toughness. Some parameters change over time or in response to well operations, such as borehole pressure, bottom hole pressure, formation pressure, formation or in situ stress, and minimum horizontal stress. As used herein, a subterranean "zone" is a generally solid region of rock or mineral, although the rock is porous and permeable, allowing for storage, injection and production of fluids (liquids and gases) positioned within the pores of the rock. As used herein, the term "zone" differentiates from subterranean caverns. A "formation," as used herein, refers to a broader subterranean region which may include one or more subterranean zones, layers, or strata, and may also include one or more subterranean caverns.

Subterranean Caverns

A subterranean formation may include a subterranean cavern 102, such as seen in FIG. 5. A "subterranean cavern," as used herein, is a void or open space defined within the rock or mineral of a zone, such as a salt cavern. A subterranean cavern may be selected for waste disposal because it provides a defined space into which to inject waste fluids while providing for containment within the cavern. The zone in which the cavern is located has associated physical parameters as is known in the art.

Disposal Wells

Turning again to FIG. 1, a disposal well 20 has a wellbore 22 extending through the formation 16 and through the target zone 10. A disposal well 20 may be a converted production well in a zone depleted of hydrocarbons or a dedicated disposal or injection well. The wellbore 22 is typically cased along at least a portion of its depth with a tubular casing 30. One or more tubulars can be positioned in the wellbore and casing, and injection can occur through the tubulars or along an annulus between the wellbore or casing and the tubular. Injection can be performed below or above hydraulic fracturing pressures. Where the formation is fractured during injection, multiple fractures 32 are created in the target zone. Fracturing is well known in the art and will not be described here. Downhole tools, as are known in the art, can be employed during injection and hydraulic fracturing operations, such as packers 34, seals, valves, screens, and measuring and sensing equipment (such as pressure sensors, bottom hole sensors, etc.). Measurement equipment can sense, record, and transmit data representative of temperature, pressure, flow rate, acidity, etc., as measured at the surface, in the wellbore, at the bottom of the hole, etc. Measurements may be made at downhole, wellbore, wellhead locations.

Pumping equipment, such as an injection pump 40 is positioned at the wellhead 42 to pump waste fluids into the wellbore under pressure. Waste fluids or slurry 50 is pumped into the wellbore and into the subterranean formation. Waste slurry 50 is seen housed in an above ground storage tank in FIG. 1, however, as is understood by those of skill in the art, the slurry can be trucked in, piped in from storage or processing facilities, stored on-site, or created on-site. Associated operational equipment, such as valving, controls, and safety valves are known in the art and are not shown in detail in FIG. 1. An exemplary valve 52 is provided for reference. Safety valves, pressure relief valves, fluid control valves, and the like are known in the art and used in injection operations.

Injection can take place during a single injection, multiple injections over time, batch injections, etc. Injection into a zone or cavern can occur from multiple wellbores. The injection wellbore can be horizontal, deviated, or vertical.

Fat, Oil and Grease Wastes

Fat, Oil, and Grease (FOG) are food preparation byproducts that can cause problems to wastewater systems. They are water insoluble and may stick and accumulate on the interior of sewage pipe walls, eventually causing pipe blockage and sewage overflow. FOG is composed of a mixture of different saturated (palmitic), monosaturated (oleic), and polystaurated (linoleic) fatty acids, along with some mineral/metal content (mainly Calcium) that is introduced to the fatty acid during the saponification process. Saponification occurs when fatty acids from the FOG react with dissolved salts which can be found in wastewater or reacts with elements such as calcium found in the concrete of the wastewater impoundments.

FOG can be classified into two main types: yellow grease and brown grease. Yellow grease is grease that has had no contact with water and is being collected from fryers and grills. Yellow grease is recyclable and can be converted into products that have direct human contact (except food) such as biodiesel, glycerin, soaps, and others. Brown grease is usually collected from grease traps (GT) and/or grease interceptors (GI) after the FOG has been in contact with water. It can only be recycled into products that do not have direct contact with human and animal such as paints, lubricants, and biogas.

Large volumes of FOG wastes must be disposed of, or recycled, each year. For example, the State of Texas has 12 landfills that can receive FOG wastes. More than 10,000 tons of FOG was produced from Texas municipal plants and have been disposed in these landfills in 2016.

Physical Properties of FOG

FOG is lighter than water with density ranges between 0.863 and 0.926 g/cc depending on the composition. Saturated fatty acids have higher melting point than the unsaturated ones (palmatic fatty acid has a melting point of 145° F., while linoleic has a melting point of 12° F.). Since FOG is a mixture of different types of fatty acid, it will have a melting range that is dependent on the actual composition. However, heating the FOG to a temperature of 120° F. should be enough to at least soften if not melt most of fatty acids content and produces a pumpable fluid with a viscosity less than 30 cP. Several researches have been conducted to measure the heat capacity of different type of plants and animal oils and fats. However, one equation that can be used to predict the Heat capacity of FOG at different temperature is listed below:

$$c_p = 1.9842 + 1.4733 \times 10^{-3} T - 4.8008 \times 10^{-6} T^2 \quad (1)$$

where $c_p$ is in kJ/kg° C., and T is in degrees Centigrade.

FOG waste is highly inhomogeneous and can have yield strength ranged from 4 to 34 kPa, porosity between 10 and 24%, and moisture content of 10-60%.

Traditional FOG Disposal Methods

FOG can be generated from residential, restaurants, and/or industrial food activities. FOG waste can be captured by a grease trap that is installed inside the building, usually under the sink. FOG can also be captured by grease interceptor that is installed outside the building to separate grease and solids from the wastewater stream.

In the United States, the volume of FOG waste generated was about 2.2 billion liters (2 million ton assuming average FOG density of 0.91 g/cc) as reported by Long et al., 2012. There are several options to dispose of these FOGs including: Landfill, biogas and biodiesel generation, anaerobic codigestion in the wastewater plants, and conversion into products such as lubricants, soaps, paints, or fuels.

The most widely disposal method of FOG waste is landfill disposal. However, because of the increasing interest in converting the FOG waste into fuel (biodiesel and biogas) in addition to environmental consideration including the release of greenhouse gases ($CO_2$ and Methane) and undesirable odor produced by the biodegradation of FOG waste, other alternatives are needed to dispose of or recycle FOG waste.

One alternative is to produce biodiesel from yellow grease (brown grease is not recommended to be used to produce biodiesel because of the water and mineral content) since it produces lower volume of greenhouse gases and less pollutants compared to diesel derived from petroleum. Also, biodiesel produced from FOG waste had higher energy consumption with lower greenhouse gas emission level than other feedstocks biodiesels (soybean and algae). However, FOG biodiesel has several disadvantages include: biodiesel is more expensive to generate and engines that uses biodiesel compared are more expensive to maintain than those which run on petroleum diesel; biodiesel is a solvent which can harm rubber hoses in the engine; biodiesel has poorer cold weather performance; and finally, because of the heterogeneous nature of FOG waste, biodiesel can have a high variation in quality.

FOG waste can also be fed into anaerobic digesters along with the primary and secondary sludge in wastewater plants to enhance the production of biogases. However, FOG waste can cause some operational issues such as clogging in the system, foaming and biomass floating. Moreover, facilities and pretreatment for co-digestion are needed, while the residual digester sludge must still be disposed (usually by dehydrating and trucking to a landfill).

Deep Earth Sequestration of FOG

Underground injection is a technique that has been widely used in the oil and gas industry to dispose of different type of wastes generated during E&P operations. Underground injection has also proven success to dispose of industrial wastes that contain naturally occurring radioactive material (NORM), as well as municipal wastewater. Also, it has been applied to sequester $CO_2$ into deep underground aquifers. Moreover, during the last 10 years, underground injection has been used to sequester over 12 million bbl of primary and secondary sludge produced from the wastewater treatment plant in Los Angeles, California.

Precedent operations demonstrate that underground injection is an economical and environmentally advantaged option to manage FOG waste. Unlike at landfills, greenhouse gases generated from the biodegradation process of FOG waste will not be emitted to the atmosphere. Instead, they are sequestered underground and are available to be produced and used in the future.

Also, an injection site can be built at the fraction of the cost needed to expand a wastewater treatment plant to accommodate the increasing volumes resulting from treatment of received FOG waste. Also, underground injection of FOG waste can be conducted at a lower cost compared to what the wastewater treatment plant charges. The other advantage of underground injection is that FOG waste can be injected as is, with no additional treatment needed, or it can be injected along with the residual digester sludge fluids to achieve reduced or zero environmental discharge at the waste water treatment plants. An injection well can be drilled inside or close to the wastewater treatment plant to save on transportation costs.

Pre-Injection Processing

Figure 2:
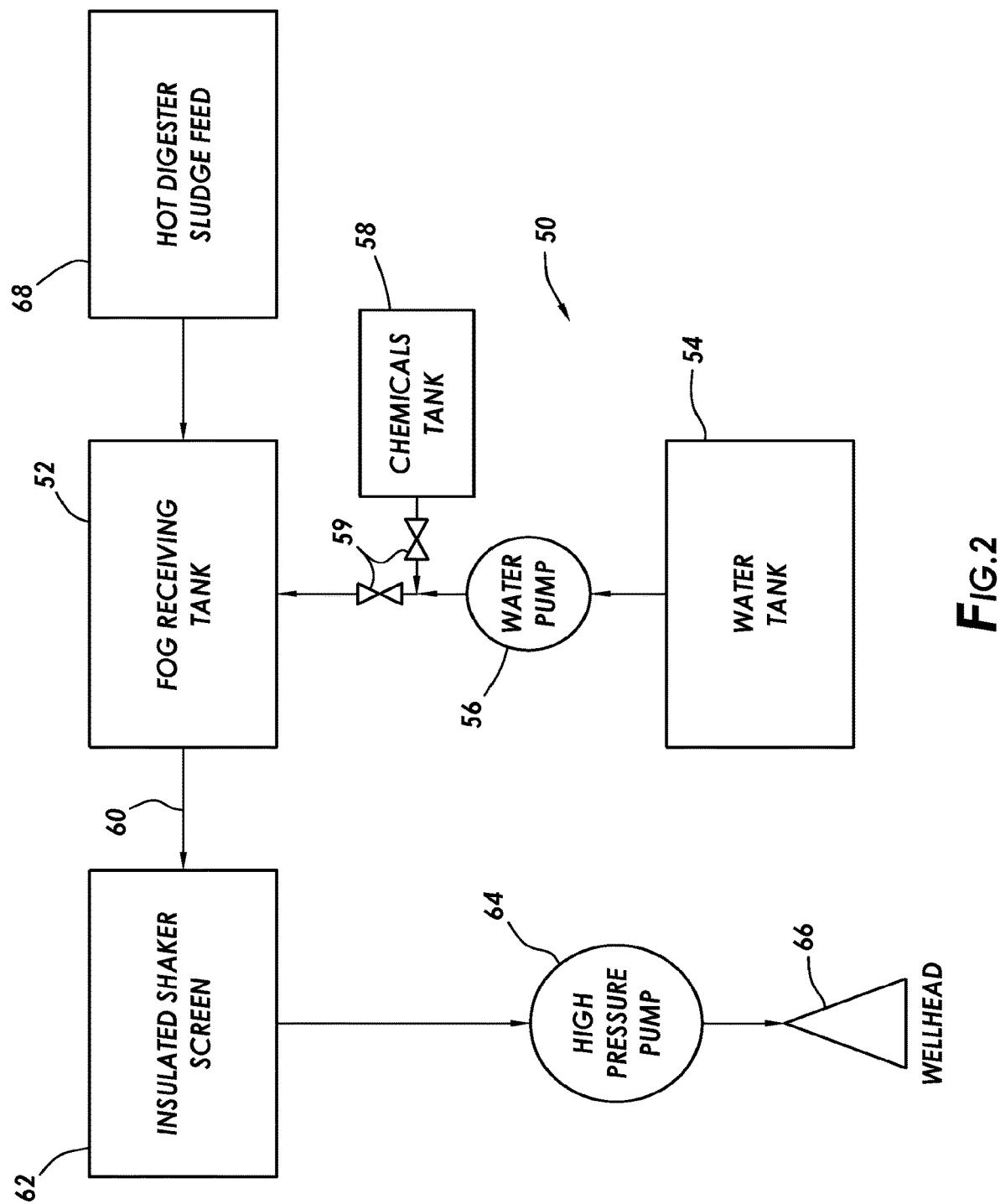
FIG. 2 is a schematic of a Fat, Oil and Grease waste facility according to an embodiment of the disclosure.

A schematic of a disclosed FOG waste injection facility, generally designated as 50, is presented by FIG. 2. A receiving or processing tank or tanks 52 are provided for the FOG waste. FOG waste can, for example, be trucked in and dumped into the tank 52. Alternate methods of delivery will be apparent to those of skill in the art, such as piping in FOG waste from a storage or treatment facility. Based on the physical properties of FOG wastes, the tanks 52 are heated to soften the grease and avoid FOG waste deposition inside the tanks. In an embodiment, the tank 52 is heated, for example, to 120° F. A water supply 54 is provided for adding water to the FGO waste to create a pumpable slurry. A water pump 56 can used to transfer the water to the FOG waste tank. Additionally or alternately to heating the tank itself, hot water can be added to the FOG waste tank. The water can be heated at the water source or at another point prior to entry into the tank. Hot water addition may be needed, for example, in cases where the FOG waste has high solids content or has content with higher melting points. Further, the water, or the mixture of FOG waste and water, can be dosed with surfactant to reduce the interfacial tension and avoid separation between water and FOG phases. Surfactants are known in the art.

To accelerate FOG waste decomposition process, microbial additives or enzymes can be used. They will also reduce FOG waste deposits by biodegradation of fats. The first step of fats biodegradation is the hydrolysis of ester bonds that links the molecule of glycerol to the fatty acids or phosphoric acids that compose the triglycerides. The hydrolysis of FOG waste is catalyzed by lipases, which are a fat degrading enzymes. The reaction of FOG waste with lipases leads to the hydrolysis of triacylglycerol's to diacylglycerols, mono-acylglycerols, fatty acids and glycerol. Microbial additives to break down fat, oil and grease is known in the art and commercially available. Similarly, enzyme additives are known in the art and commercially available.

An exemplary additives supply 58 is shown in FIG. 2. The additives supply can include multiple tanks, piping, valves 59, and systems, as are known in the art, for delivery and mixing of additives into the water, either at a water tank or into a flow of water as it moves towards or into the FOG waste tank. Multiple additives supplies can be used and positioned as is convenient.

The FOG waste, water, and possibly additive mixture is now a pumpable slurry, although larger solids particles may still need to be removed. The heated pumpable slurry is then transferred, preferably through a heated transfer system, such as heated pipes 60, to avoid consolidation of FOG waste, to one or more screening mechanisms 62, such as shaker screens, to remove any larger solid particles. The use of shaker screens is known in the art.

Table 1 below presents the specific heat values form some oils and fats to calculate the cost needed to heat up FOG from 80° F. to 120° F. The calculations show that if natural gas is used in the heating process the cost will be up to $0.28/ton of FOG; using electricity would increase the cost to up to $1.25/ton. The Equation 1 provided herein above can be used to calculate the average heat capacity of FOG at 80° F. The heat capacity value estimated by the Equation 1 is 0.48 BTU/lb. ° F., which results in a heating cost of $0.29/ton and $1.27/ton for natural gas and electricity heaters, respectively.

TABLE 1

| Material | Heat Capacity BTU/lb. ° F. | Heat/ton to heat 1° F. BTU | Heat/ton to heat 40° F. BTU | Eq. Natural Gas cf/ton | Cost $/ton | Eq. kWh/ton | Cost $/ton |
| --- | --- | --- | --- | --- | --- | --- | --- |
| Butter | 0.34 | 680 | 27,200 | 26.23 | $0.20 | 7.97 | $0.90 |
| Lard | 0.31 | 620 | 24,800 | 23.92 | $0.19 | 7.27 | $0.82 |
| Oil, Castor | 0.47 | 940 | 37,600 | 36.26 | $0.28 | 11.02 | $1.25 |
| Oil, Olive | 0.47 | 940 | 37,600 | 36.26 | $0.28 | 11.02 | $1.25 |
| Oil, vegetable | 0.4 | 800 | 32,000 | 30.86 | $0.24 | 9.38 | $1.06 |
| Sesame oil | 0.39 | 780 | 31,200 | 30.09 | $0.23 | 9.14 | $1.03 |
| Soya bean oil | 0.47 | 940 | 37,600 | 36.26 | $0.28 | 11.02 | $1.25 |
| Average | | | 32,571 | 31.41 | $0.24 | 9.55 | $1.08 |

The above is based on average gas prices in Texas for industrial users of $5.56/1000 cf, for commercial users of $7.74/1000 cf, and for residential users of $9.21/1000 cf, and an average electricity price in Texas of $0.113/kWh.

Heating cost can be minimized/eliminated if the injection facility can be placed inside or close by a wastewater treatment plant. Digester sludge from a wastewater treatment facility usually has enough heat to soften the FOG. A heated digester sludge supply 68 in seen in FIG. 2. The heated digester sludge is from a wastewater treatment facility and transported by known methods to be introduced to the FOG waste tank. For example, the TIRE plant in Los Angeles produces digester sludge with an average temperature of 133° F. Mixing the digester sludge with FOG waste in the receiving tank 52 should provide the needed heat to inject the FOG waste as a pumpable slurry.

Injection into a Subterranean Formation

The pumpable FOG-bearing slurry is then pumped downhole using, for example, a high pressure pump 64 connected to the wellhead 66, and into a safe, contained underground formation 16. The target zone 10 in the formation 16 is selected because it has suitable permeability, porosity, boundary layers, formation pore pressure, formation stresses, Young's modulus of elasticity, and Poisson's ratio, overburden pressure, etc., as is known in the art. Injection can be below or above fracturing pressure. Injection can take place during a single injection, multiple injections over time, batch injections, etc. Injection into a zone can occur from multiple wellbores. The injection wellbore can be horizontal, deviated, or vertical.

To conclude the injection stage, the well and injection system can be flushed by heated water to clean any FOG waste residuals from the injection lines to avoid any solidification during shut-in periods. Ethanol (or other solvents as are known in the art) can be added periodically to dissolve any heavy FOG that might not melt at 120° F.

Injection into a Subterranean Cavern

The pumpable FOG-bearing slurry can be pumped downhole, using, for example, a high-pressure pump to the wellhead and thence into a safe, contained underground cavern, such as a salt cavern. Exemplary caverns are seen FIGS. 5-6. The cavern comprises a large open space located deep under the earth's surface. The cavern is selected because it provides a defined space into which to inject processed FOG wastes while providing for containment within the cavern. Injection can take place during a single injection, multiple injections over time, batch injections, etc. Injection into a zone can occur from multiple wellbores. The injection wellbore can be horizontal, deviated, or vertical.

The injection would preferably use a dual-tubing completion, one tubing to inject the organic materials and the other to extract the cavern brine. Such a dual-tubing completion is typical for salt cavern injections. After a sufficient volume of injectable FOG waste slurry has been deposited in the cavern, injection processes are ceased.

To conclude the injection stage, the well and injection system can be flushed by heated water to clean FOG waste residuals from the injection lines to avoid any solidification during the shut-in periods. Ethanol or other solvents can be added periodically to dissolve any heavy FOG wastes that might not melt at 120° F. The injection pressure and rate should be continuously monitored during the course of injection and shut-in periods throughout the life span of the injection well. Also, a Mechanical Integrity Test can be carried out at regular intervals based on the standards laid down by the EPA or other regulating authorities.

During Sequestration

After the FOG-bearing slurry is pumped into the subterranean formation (zone or cavern), the organic matter in the FOG-bearing slurry will undergo anaerobic digestion and decompose into biogas. Anaerobic digestion is a series of processes in which microorganisms break down organic matter in the absence of oxygen to produce biogas. The organic loading rate of FOG waste varies depending on the ratio between the total volatile acids content to total alkalinity (TVA/alkalinity).

Under the anaerobic environment at the subsurface level, the organic matter breaks down to $CH_4$ and $CO_2$. FOG wastes, depending on origin, have biodegradable volatile solids ranging from 17% to 93% (w/w), which produces biogas with high methane yields, for example between 0.65-0.75 $L_{CH_4}/g_{vs}$. The decomposition rate of organic matter is not fixed since it depends on the total volatile solids, which vary with the source.

Figure 3:
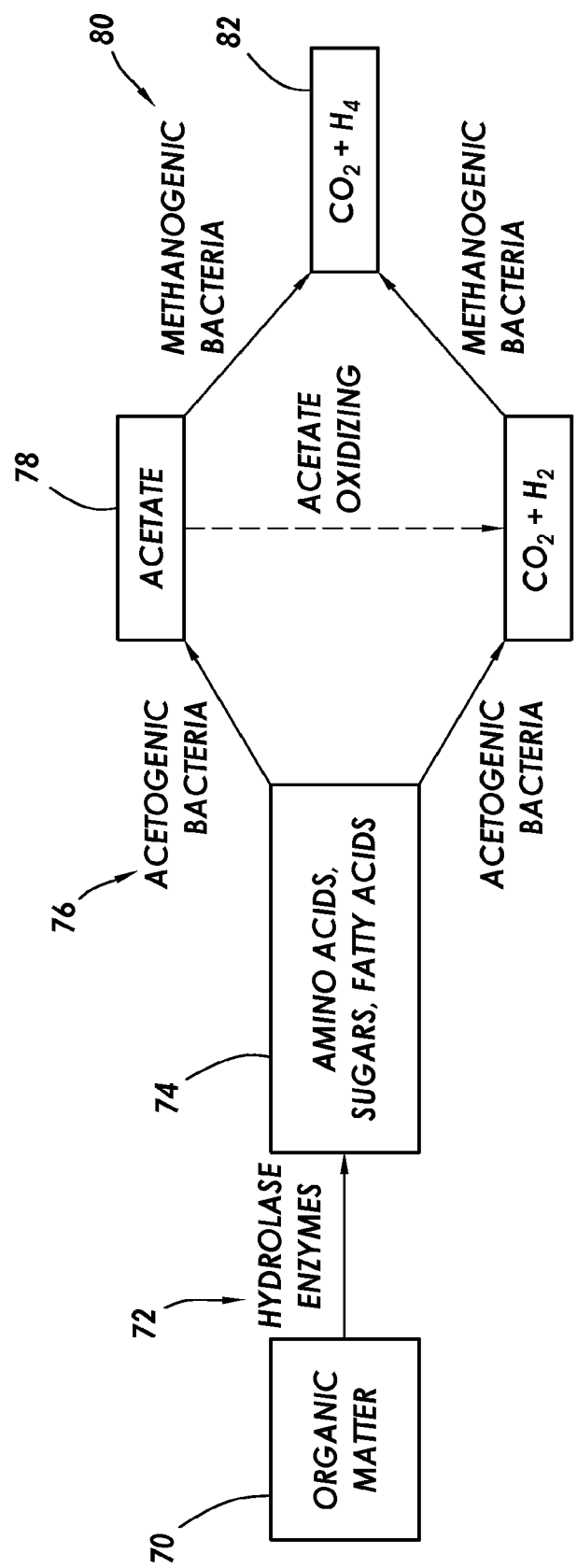
FIG. 3 is a schematic showing the decomposition of organic matter, or FOG waste, into methane and carbon dioxide, according to embodiments of the disclosure.

The schematic in FIG. 3 shows the process of organic waste, such as FOG waste, decomposition to biogas. After the FOG waste or FOG-bearing slurry is pumped into the subterranean formation, the fluid is digested anaerobically. Anaerobic digestion is a series of processes in which microorganisms break down organic matter in the absence of oxygen to produce biogas. Different group/class of microorganisms are introduced to the organic material which is hydrolyzed by the microorganisms and converted to amino acids, sugars, fatty acids. These products further undergo fermentation and methanogenesis in presence of methanogens to produce biogas which is a mixture of $CO_2$ and $CH_4$ as shown in FIG. 3. FIG. 3 shows organic matter 70, broken down by hydrolase enzymes 72 into amino acids, sugars and fatty acids 74. These byproducts are broken down by acetogenic bacteria, in the exemplary diagram shown, into acetate 76 or carbon dioxide and hydrogen ($H_2$) at 78. Methogenic bacteria 80, in the exemplary diagram shown, further processes these chemicals into carbon dioxide and methane at 82. Additional processes, such as acetate oxidation 84 may occur as well, as is known in the art.

Where injection of the FOG slurry is into a subterranean cavern, the cavern pressure should be monitored to estimate the decomposition rate of the injected organic matter. The change in the pressure is proportional to the gas volume generated in the cavern assuming constant cavern volume. Gas samples can be collected from the wellhead to determine the gas composition. Formation parameters, which change over the lifetime of a field, should be monitored.

Post-Sequestration Production of Biogas

At the end of well life, two scenarios are proposed depending on the quantity of methane formed in the formation due to the decomposition of FOG wastes. If economical, methane $CH_4$ can be produced at the end of the well life after allowing the injected FOG waste to decompose. The $CO_2$ gas, a byproduct of the organic matter decomposition, will partially dissolve in formation brine, if present. Where injection of the FOG slurry is into a formation zone, the produced methane will accumulate at the top of the zone due to methane's volatile nature and the sealing characteristic of the upper boundary zone, such as a non-permeable shale zone, preventing further upward migration. The accumulated methane can either be collected from the injection well or by drilling a new production well. Where the FOG slurry is emplaced in a subterranean cavern, after a sufficient time, the cavern will contain producible quantities of commercially valuable products, such as methane and carbon dioxide. Production gases can be extracted from extraction tubing running to the cavern from the surface.

If the quantity of methane is small and not economical to produce back to the surface. The well can be plugged to prevent the back flow of injectate and decomposed gases into the wellbore.

Disposal of Low-Density, Organic Waste Materials into a Subterranean Cavern

A salt cavern is a cavity that can be naturally or artificially created in an underground salt structure. Salt caverns can be used for storage (i.e., crude oil, natural gas) or disposal purposes. Inactive salt caverns are usually filled with supersaturated brine (26.3 wt. % NaCl) to stabilize the cavern and prevent cavern collapse. This supersaturated brine will need to be removed from the cavern to make room for incoming disposal materials. Removal of brine can occur during storage or disposal operations. The displaced brine can be stored for future use, for example, in recovering the material stored in the cavern. Alternately, the displaced brine can be disposed of, for example, where the emplaced material will be permanently sequestrated in the cavern.

Currently, there are several salt caverns in the United States used to dispose of solid wastes. These wastes are introduced at the bottom of the cavern as the wastes have a density greater than that of the saturated brine, and so tend to sink to the cavern bottom. However, low-density material cannot be introduced to the cavern from the bottom as it tends to rise within the cavern, contaminating the cavern brine, instead of merely displacing it. Methods of emplacing low-density, organic waste material into an underground cavern will be described here.

Low-density organic material has a density lower than the density of the saturated brine (1.2 g/cc) in the cavern. Low-density organic waste materials, as used herein, include: biosolids, FOG (fat, oil, and grease) waste, food waste, animal manures, agricultural residuals, and plant waste. (Some amounts of non-organic wastes may be present in these waste materials or sources. Such non-organic materials can be separated out or, if non-interfering with the processes herein, left in place.) When these low-density organic waste materials are emplaced in a salt cavern, they tend to float at the top of the saturated brine in the cavern due to their lower density. In emplacing the low-density material in the cavern, the material is introduced at the top of the cavern. Simultaneously, saturated brine is removed from the cavern's bottom to provide space for incoming low density material.

FIGS. 5-6 are schematic diagrams of exemplar low-density organic material processing and injection systems according to aspects of the disclosure.

Underground disposal in a salt cavern is an economically and environmentally beneficial option to manage waste. Cavern disposal has a smaller footprint than landfills. Furthermore, when organic wastes are disposed of in a salt cavern, the generated biogases from the biodegradation process will not be emitted to the atmosphere. Instead, it will be trapped in the cavern, which will be available to be produced and used in the future.

Pre-Injection Processing

The low-density material will need to be processed prior to placement in the cavern using mixing equipment, tanks, and pumps. Processing equipment and its use is known in the art. The low density organic material 104 is mixed with saturated brine 106 to prepare pumpable slurry 109 in a processing facility 108. The pumpable organic waste slurry 109 is then ready for emplacement, or injection, in the subterranean cavern. The saturated brine can be brine previously pumped from a formation or another source, or can be created by known processes. The pumpable low-density slurry 109 can have a significant proportion of solid materials therein. For example, the pumpable slurry 109 can have up to approximately 30 percent by volume of solids. Other concentrations of solids can be employed.

Figure 4:
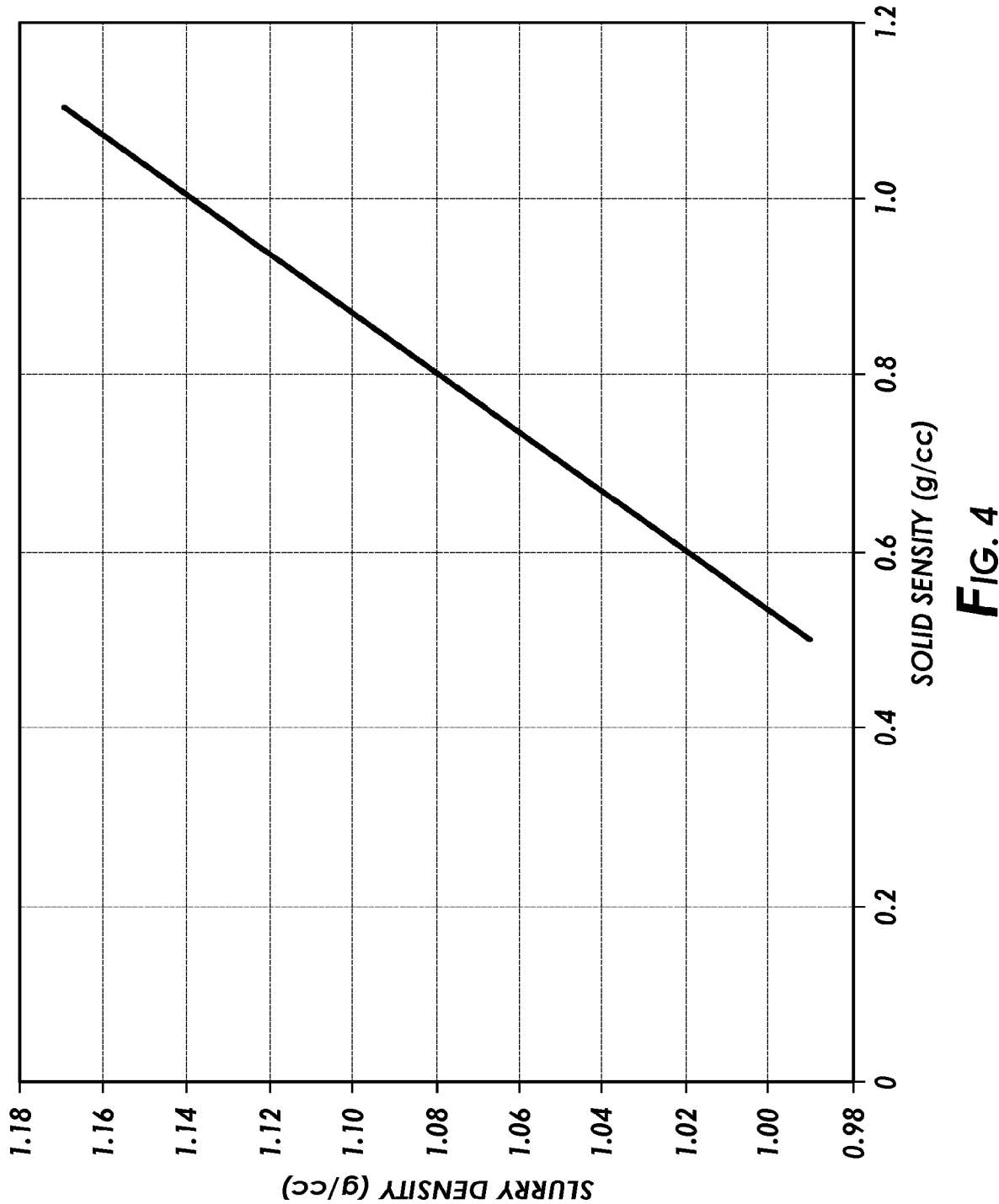
FIG. 4 is a chart showing low-density organic waste density vs. solids density for an organic slurry having approximately 30 percent by volume solids content, according to embodiments of the disclosure.

The organic waste slurry density will depend on the solid material density (at a given percentage of solids), as shown in FIG. 4. As shown, the slurry density (g/cc) can range from approximately 1 to approximately 1.18 g/cc depending on the solids density, shown ranging from approximately 0.5 to approximately 1.2 g/cc. FIG. 4 shows slurry density for a 30 percent by volume solids content. Persons of skill in the art understand that similar charts can be employed for other density percentages, etc.

Since the low-density organic waste slurry is to be emplaced into a salt cavern, the salinity of the slurry becomes an important consideration. The salt cavern exists in a salt formation or structure. Unsaturated water, water byproducts, or water-bearing materials will dissolve the salts from the formation, leading to enlargement of the cavern. While some enlargement of a cavern may be acceptable, excess enlargement can lead to collapse of or damage to the cavern. Saturated brine is approximately 26.3 percent by weight sodium chloride. Saturated brine should not result in (significant) dissolution of the cavern walls. The low-density organic wastes will, more than likely, not contain such a high concentration of salt.

The organic material is mixed with brine to create a high-chloride contaminated material. The brine and organic material forms a semi-liquid material or slurry to emplace into the salt cavern. The slurry may exist in separate phases, which are sufficiently mixed together to be a pumpable slurry. In an embodiment, the aqueous phase in the pumpable slurry is saturated brine (e.g., approximately at least 26.3 percent by weight sodium chloride). In some embodiments, the aqueous phase is less than fully saturated, allowing for the dissolution of the cavern walls and enlargement of the cavern. The organic materials are mixed with brine to preferably create a high-chloride or high-salinity material. Some of the organic wastes are expected to be in solid phase, and to remain solid when emplaced. Some of the organic wastes are immiscible in water (e.g., oil). Some of the organic waste may carry or liberate water (e.g., plant or food waste), which may then dilute the aqueous phase brine. Consequently, it may be desirable to add salts to the slurry in the pre-injection process or tank to saturate or increase the saline of the released water content. Alternately, the water carrying materials can be limited in volume in the slurry to prevent an undesirable desalinization of the slurry, either in the pre-injection tanks or in the cavern. The organic material and/or the slurry can be monitored during preparation to ensure it is high in chloride and to determine the need for addition of salts or other alterations to the slurry.

Exemplary monitored parameters and monitoring points are listed in the Table 2 below.

TABLE 2

| Monitored parameter | Monitoring point |
| --- | --- |
| Emplacement volume | Pre injection tank |
| Solid content | Pre injection tank |
| Salt content | Pre injection tank |
| Emplacement rate | Injection line |
| Emplacement pressure | Wellhead (annulus port) |
| Displacement pressure | Wellhead (Tubing port) |
| Displacement rate | Production line |

Well Completion Techniques

Two different well completion techniques are disclosed to emplace low-density organic material slurry into a salt cavern filled with brine.

A schematic of an exemplary single completion well, where the emplacement of slurry and the displacement of cavern brine employs a single tubing string is seen in FIG. 5. The system is generally designated as 100. A low-density organic material slurry processing facility 108 mixes low-density organic wastes 104 and brine 106. The brine can be created for the purpose or recycled from earlier production of brine from salt caverns or other subterranean formations. The salinity of the low-density organic waste slurry 109 can be monitored during and after processing. The salinity can be adjusted by the addition of salts or water, for example. The slurry will be of a selected salinity designed to result in minimal dissolution of the cavern walls, or to allow for controlled enlargement of the cavern by dissolution. The slurry 109 is transported to an injection pump 110 and injected into the cavern via the wellhead 112 and wellbore 118. The wellbore typically has a surface casing 114 and a long string casing 115, as shown. The cavern 102 contains brine 130, which will be removed as part of the low-density organic waste emplacement process.

In a single completion well, as in FIG. 5, a first tubing is used to emplace the slurry and a second tubing is used to displace the cavern brine. In the embodiment shown, a brine displacement tubing 116 extends through the formation and to a lower region of the cavern. Low-density organic slurry 109 is pumped into the cavern through the wellbore 118 (e.g., though the long string casing 115). More specifically, the slurry is pumped down the annulus defined between the wellbore wall (cased or not) and the displacement tubing 116. The slurry is deposited in an upper region of the cavern, as the low-density slurry will float on the cavern brine. The cavern brine 130 is displaced through the displacement tubing 116 to the surface. The cavern brine is removed from the salt cavern simultaneously to injection of the low-density slurry.

The cavern brine displace from the cavern can be processed after production from the cavern. The produced cavern brine can, for example, pass through filter mechanisms 122 to remove solids that might sink from the low-density material slurry to the brine zone below. Separated solids can be moved back 124 to the processing area to be emplaced back into the salt cavern. A safety pressure relief valve 120 can be used at the wellhead 112 to prevent cavern pressure build-up.

A schematic of an exemplary dual completion well, where the emplacement of slurry and the displacement of cavern brine employs a dual tubing string is seen in FIG. 6. The system in FIG. 6 is similar to that of FIG. 5, and like numbers represent like parts.

The dual completion string can be used as follows. The low-density organic waste slurry 109 is injected or emplaced into the salt cavern 102 through an emplacement tubing 132 which extends through the wellbore 118. Cavern brine 130 is displaced through the displacement tubing 116 to the surface. The produced cavern brine 130 can pass through filter mechanisms 122 as described above.

As with the disclosures above regarding placement of FOG wastes, the low-density organic waste slurry will degrade into methane and carbon dioxide. These biogases can later be produced from the salt cavern, if desired.

Single Completion Calculations

The controlling parameter to calculate the flow rate in and out for salt cavern storage when using a single completion system is the casing shoe pressure ($BHP_C$). This pressure should not exceed 0.8 Local formation fracture pressure.

$$WHP_C = BHP_C - 0.052 * \rho_{LD} * D_C + FL_{LD-C} \quad (2)$$

Where $FL_{LD-C}$ is a function in $ID_C$, $OD_T$, $D_C$, $Q_{LD}$, $\mu_{LD}$, and $\rho_{LD}$ $$BHP_T = BHP_C + 0.052 * \rho_{LD} H_{LD} + 0.052 * \rho_B H_B \quad (3)$$

$$\text{And } WHP_T = BHP_T - 0.052 * \rho_B * D_T + FL_{B-T} \quad (4)$$

Where $FL_{B-T}$ is a function in $ID_T$, $D_T$, $Q_B$, $\mu_B$, and $\rho_B$.

Equations 2 through 4 can be solved to estimate the low-density material storage rate and brine withdrawal rate from the salt cavern while keeping cavern pressure within the safe limits.

The Equations use the following parameters:
$WHP_C$=Wellhead Casing Pressure (psi) (measured at the surface)
$BHP_C$=Bottomhole Casing Pressure (psi) (measured at the casing shoe)
$WHP_T$=Wellhead Tubing Pressure (psi) (measured at the surface)
$BHP_T$=Bottomhole Tubing Pressure (psi) (measured at the tubing shoe)
$ID_C$=Casing Inside Diameter (in.)
$OD_T$=Tubing Outside Diameter (in.)
$ID_T$=Tubing Inside Diameter (in.)
$D_C$=Casing Shoe Depth (ft)
$D_T$=Tubing Shoe Depth (ft)
$Q_{LD}$=Low-Density Material Flow Rate in the Casing (BPM)
$Q_B$=Brine Flow Rate in the Tubing (BPM)
$\mu_{LD}$=Low-Density Material Viscosity (cP)
$\mu_B$=Brine Viscosity (cP)
$\rho_{LD}$=Low-Density Material Density (ppg)
$\rho_B$=Brine Density (ppg)
$H_{LD}$=Low-Density Material Hight in the Cavern (ft)
$H_B$=Brine Hight in the Cavern (ft)
$FL_{LD-C}$=Friction Loss due to Flow of Low-Density Material in the Casing (psi)
$FL_{B-T}$=Friction Loss due to Flow of Brine in the Tubing (psi)
$C_{LD}$=Average Low-Density Material Compressibility ($psi^{-1}$)
$P_{cavern}$=Average Cavern Pressure (psi)
$P_i$=Initial Cavern Pressure (psi)
$V_C$=Cavern Volume (bbl)
$V_{LD-max}$=Maximum Low-Density Material Storage Volume (bbl)
$B_B$=Brine Formation Volume Factor=(1 bbl/bbl)
$\phi$=Porosity of low-density solid material Dual Completion Schematic and Calculations The controlling parameter to calculate the flow rate in and out for salt cavern storage when using a dual completion is the emplacement tubing shoe pressure ($BHP_{EMT}$). This pressure should not exceed 0.8 Local formation fracture pressure.

$$WHP_{EMT} = BHP_{EMT} - 0.052 * \rho_{LD} * D_{EMT} + FL_{LD-EMT} \quad (5)$$

Where $FL_{LD-EMT}$ is a function in $ID_{EMT}$, $D_{EMT}$, $Q_{LD}$, $\mu_{LD}$, and $\rho_{LD}$.

$$BHP_{DIT} = BHP_{EMT} + 0.052 * \rho_{LD} H_{LD} + 0.052 * \rho_B H_B \quad (6)$$

$$\text{And } WHP_{DIT} = BHP_{DIT} - 0.052 * \rho_B * D_{DIT} + F_{LB-DIT} \quad (7)$$

Where $FL_{B-T}$ is a function in $ID_{DIT}$, $D_{DIT}$, $Q_B$, $\mu_B$, and $\rho_B$.

Equations 5 through 7 can be solved to estimate the low-density material storage rate and brine withdrawal rate from the salt cavern while keeping cavern pressure within the safe limits.

The maximum storage capacity for liquid/semi-liquid low-density material can be calculated using the following equation:

$$V_{LD-max} = C_{LD} * V_C * (P_{Cavern} - P_i) + V_C \quad (7)$$

The maximum storage for solid low-density material can be calculated using the following equation:

$$V_{LD-Max} = V_c * (1 - \emptyset) \quad (8)$$

The Equations use the following parameters:
$WHP_{EMT}$=Wellhead Emplacement Tubing Pressure (psi) (measured at the surface)
$BHP_{EMT}$=Bottomhole Emplacement Tubing Pressure (psi) (measured at the emplacement tubing shoe)
$WHP_{DIT}$=Wellhead Displacement Tubing Pressure (psi) (measured at the surface)
$BHP_{DIT}$=Bottomhole Displacement Tubing Pressure (psi) (measured at the displacement tubing shoe)
$ID_{EMT}$=Emplacement Tubing Inside Diameter (in.)
$ID_{DIT}$=Displacement Tubing Inside Diameter (in.)
$D_{EMT}$=Emplacement Tubing Shoe Depth (ft)
$D_{DIT}$=Displacement Tubing Shoe Depth (ft)
$Q_{LD}$=Low-Density Material Flow Rate in the Emplacement Tubing (BPM)
$Q_B$=Brine Flow Rate in the Displacement Tubing (BPM)
$\mu_{LD}$=Low-Density Material Viscosity (cP)
$\mu_B$=Brine Viscosity (cP)
$\rho_{LD}$=Low-Density Material Density (ppg)
$\rho_B$=Brine Density (ppg)
$H_{LD}$=Low-Density Material Hight in the Cavern (ft)
$H_B$=Brine Hight in the Cavern (ft)
$FL_{LD-EMT}$=Friction Loss due to Flow of Low-Density Material in the Emplacement Tubing (psi)

$FL_{B\text{-}DIT}$=Friction Loss due to Flow of Brine in the Displacement Tubing (psi)

$C_{LD}$=Average Low-Density Material Compressibility (psi$^{-1}$)

$P_{cavern}$=Average Cavern Pressure (psi)

$P_i$=Initial Cavern Pressure (psi)

$V_C$=Cavern Volume (bbl)

$V_{LD\text{-}max}$=Maximum Low-Density Material Storage Volume (bbl)

$B_B$=Brine Formation Volume Factor=(1 bbl/bbl)

Subterranean Organic Material Storage for Carbon Sequestration

It is now desirable to effectively remove carbon from the surface of the earth and its above-ground water, land and air systems. Removing carbon from these earth systems is believed to positively effect climate change and mitigate the negative effects of carbon on the environment. Further, governments are enacting legislation aimed at reducing carbon use and encouraging carbon sequestration.

A method of sequestering carbon is disclosed in which organic materials, which contain carbon, are specifically created or grown to capture and store carbon. These stored-carbon organic materials are then processed, as described above with respect to FOG waste and organic material waste, to create a stored-carbon bearing pumpable slurry. The stored-carbon bearing pumpable slurry is then injected into a subterranean formation, either at a target zone or into a subterranean cavern.

For example, algae can be grown, harvested, and dried. The carbon-rich algae can then be slurrified and injected into a subterranean formation using the methods described above.

CONCLUSION

The words or terms used herein have their plain, ordinary meaning in the field of this disclosure, except to the extent explicitly and clearly defined in this disclosure or unless the specific context otherwise requires a different meaning. If there is any conflict in the usages of a word or term in this disclosure and one or more patent(s) or other documents that may be incorporated by reference, the definitions that are consistent with this specification should be adopted.

While the foregoing written description of the disclosure enables one of ordinary skill to make and use the embodiments discussed, those of ordinary skill will understand and appreciate the existence of variations, combinations, and equivalents of the specific embodiments, methods, and examples herein. The disclosure should therefore not be limited by the above described embodiments, methods, and examples. While this disclosure has been described with reference to illustrative embodiments, this description is not intended to be construed in a limiting sense. Various modifications and combinations of the illustrative embodiments as well as other embodiments of the disclosure will be apparent to persons skilled in the art upon reference to the description. It is, therefore, intended that the appended claims encompass any such modifications or embodiments.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure. The various elements or steps according to the disclosed elements or steps can be combined advantageously or practiced together in various combinations or sub-combinations of elements or sequences of steps to increase the efficiency and benefits that can be obtained from the disclosure. It will be appreciated that one or more of the above embodiments may be combined with one or more of the other embodiments, unless explicitly stated otherwise. Furthermore, no limitations are intended to the details of construction, composition, design, or steps herein shown, other than as described in the claims.

The systems, methods, and apparatus in the embodiments described above are exemplary. Therefore, many details are neither shown nor described. Even though numerous characteristics of the embodiments of the present disclosure have been set forth in the foregoing description, together with details of the structure and function of the present disclosure, the present disclosure is illustrative, such that changes may be made in the detail, especially in matters of shape, size and arrangement of the components within the principles of the present disclosure to the full extent indicated by the broad general meaning of the terms used in the attached claims. The description and drawings of the specific examples above do not point out what an infringement of this patent would be, but are to provide at least one explanation of how to make and use the present disclosure. The limits of the embodiments of the present disclosure and the bounds of the patent protection are measured by and defined in the following claims.

It is claimed:

1. A method of sequestering low-density organic waste materials into a subterranean cavern defined in a subterranean formation, a wellbore extending through the subterranean formation, the method comprising:
   processing low-density organic waste material to create a pumpable, organic waste bearing slurry containing the low-density organic waste material, the processing comprising:
      heating the low-density organic waste material to reduce a viscosity thereof to about 120 degrees Fahrenheit; and
      mixing brine water with the organic waste material; and
      preparing a low-density organic waste bearing slurry having a reduced viscosity of about 30 cP and a density of about 0.863 g/cc to 0.926 g/cc;
   pumping the low-density organic waste bearing slurry through the wellbore and into a salt cavern defined in the subterranean formation; and
   sequestering the low-density organic waste bearing slurry in the subterranean cavern, the salt cavern filled with brine.

2. The method of claim 1, wherein the low-density organic waste material is comprised of: fat, oil, grease, animal manure, agricultural residuals, or plant waste.

3. The method of claim 1, wherein the brine water mixed with the organic waste materials is saturated brine.

4. The method of claim 1, further comprising: after the sequestered organic waste material bearing slurry produces methane gas, producing the methane gas from the subterranean formation.

5. The method of claim 1, further comprising adding heated digester sludge from a wastewater plant.

6. A method of injecting low-density organic waste materials into an inactive subterranean salt cavern substantially filled with supersaturated brine, the method comprising:
   processing low-density organic waste material to create a pumpable slurry, wherein the organic wastes are selected from the group consisting of biosolids, fat, oil, and grease food preparation byproducts, food waste, and animal manures, the processing comprising:

mixing saturated brine with the low-density organic waste material, the resulting pumpable slurry having an aqueous phase comprising saturated brine, heating the low-density organic waste material to reduce the viscosity thereof, the resulting pumpable slurry having a density of less than that of the brine in the subterranean salt cavern and a viscosity of about 30 cP; and then injecting the pumpable slurry into an upper zone of an inactive, brine filled, subterranean salt cavern, the brine in the subterranean salt cavern being supersaturated brine, through a first tubing extending into the upper zone of the subterranean salt cavern;

pumping, simultaneous to injecting the pumpable slurry, brine in the subterranean salt cavern from a lower zone of the subterranean salt cavern through a second tubing extending into the lower zone to create space for the pumpable slurry; and sequestering the pumpable slurry in the inactive subterranean salt cavern.

7. The method of claim 6, wherein the pumpable slurry comprises up to approximately 30% by volume of solids.

8. The method of claim 6, further comprising monitoring the pumpable slurry, prior to injecting into the salt cavern, for chloride content.

9. The method of claim 6, wherein the second tubing is positioned within the first tubing, thereby creating an annulus between the first and second tubing, and wherein injecting the pumpable slurry through the first tubing further comprises injecting the pumpable slurry through the annulus.

10. The method of claim 6, wherein the pumpable slurry comprises solids; and further comprising: pumping from the subterranean salt cavern the solids after the solids fall to the bottom zone of the subterranean salt cavern; and emplacing the solids back into the subterranean salt cavern.

11. The method of claim 6, wherein the subterranean salt cavern has cavern walls; and further comprising: adding salt to the pumpable slurry to prevent or reduce enlargement of the subterranean cavern due to dissolution of salts in the cavern walls.

12. The method of claim 6, wherein the subterranean salt cavern has cavern walls; and further comprising: injecting the pumpable slurry into the subterranean salt cavern, the pumpable slurry at a salinity below that of saturated brine, thereby intentionally enlarging the subterranean salt cavern by dissolution of salts in the cavern walls.

13. A method of injecting low-density organic waste materials into an inactive subterranean salt cavern substantially filled with supersaturated brine, the method comprising:

processing low-density organic waste material to create a pumpable slurry, the processing comprising:

mixing saturated brine with the low-density organic waste material, the resulting pumpable slurry having an aqueous phase comprising saturated brine, heating the low-density organic waste materials to reduce a viscosity thereof to create a pumpable slurry having a density of less than brine; and then injecting the pumpable slurry into an upper zone of the inactive subterranean salt cavern substantially filled with supersaturated brine through a first tubing extending into the upper zone of a subterranean salt cavern pumping, simultaneous to injecting the pumpable slurry, brine from a lower zone of the subterranean salt cavern through a second tubing extending into the lower zone to create space for the pumpable slurry; and sequestering the pumpable slurry in the inactive subterranean salt cavern.

\* \* \* \* \*